United States Patent
Karita

(10) Patent No.: US 9,327,465 B2
(45) Date of Patent: May 3, 2016

(54) RETREADED TIRE MANUFACTURING METHOD AND TIRES SUITED THEREFOR

(75) Inventor: Nobuki Karita, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 39 days.

(21) Appl. No.: 14/112,967

(22) PCT Filed: Apr. 16, 2012

(86) PCT No.: PCT/JP2012/060268
§ 371 (c)(1),
(2), (4) Date: Oct. 21, 2013

(87) PCT Pub. No.: WO2012/144459
PCT Pub. Date: Oct. 26, 2012

(65) Prior Publication Data
US 2014/0045410 A1 Feb. 13, 2014

(30) Foreign Application Priority Data
Apr. 21, 2011 (JP) ................................. 2011-095199

(51) Int. Cl.
*B24B 5/04* (2006.01)
*B29D 30/54* (2006.01)
*B60C 11/02* (2006.01)

(52) U.S. Cl.
CPC .............. *B29D 30/54* (2013.01); *B60C 11/02* (2013.01); *B29D 2030/541* (2013.01); *Y10T 152/10765* (2015.01)

(58) Field of Classification Search
CPC ................................ B29D 30/54; B60C 11/02
USPC ................ 451/49, 28, 57; 152/526, 532, 533, 152/209.6
See application file for complete search history.

(56) References Cited

U.S. PATENT DOCUMENTS

| | | | |
|---|---|---|---|
| 3,991,803 A * | 11/1976 | Praszek | 152/533 |
| 4,218,277 A | 8/1980 | Van Der Burg | |
| 4,258,776 A * | 3/1981 | Walters et al. | 152/209.14 |
| 2007/0039674 A1* | 2/2007 | Kaneda | 152/532 |

FOREIGN PATENT DOCUMENTS

| | | |
|---|---|---|
| CN | 101445023 A | 6/2009 |
| DE | 3623127 A1 | 1/1988 |
| EP | 0105552 A1 | 4/1984 |

(Continued)

OTHER PUBLICATIONS

English Translation of International Preliminary Report on Patentability for PCT/JP2012/060268 dated Oct. 31, 2013.
International Search Report of PCT/JP2012/060268, dated Jul. 17, 2012.

(Continued)

*Primary Examiner* — Robert Rose
(74) *Attorney, Agent, or Firm* — Sughrue Mion, PLLC

(57) ABSTRACT

A retreaded tire manufacturing method, which avoids forming the buffed surface always in the same position by buffing in tire retreading and the resulting drop in delamination resistance of new tread rubber, and tires suitably retreaded by this manufacturing method are provided. In this method, the tread rubber of a tire is abraded away circumferentially to form a tread application surface of the tire to which new tread rubber is applied. And the position where the tread application surface is formed is radially changed as the repeat count of retreading rises.

7 Claims, 4 Drawing Sheets

(56) References Cited

FOREIGN PATENT DOCUMENTS

| | | | |
|---|---|---|---|
| JP | 61-233528 | A | 10/1986 |
| JP | 63-281832 | A | 11/1988 |
| JP | 0195009 | A | 4/1989 |
| JP | 8-309881 | A | 11/1996 |
| JP | 11207831 | A | 8/1999 |
| JP | 2005178038 | A | 7/2005 |
| JP | 2010260312 | A | 11/2010 |
| JP | 2010274520 | A | 12/2010 |
| WO | 9208603 | A1 | 5/1992 |

OTHER PUBLICATIONS

Communication dated Mar. 9, 2015 from the State Intellectual Property Office of People's Republic of China in counterpart Application No. 201280019322.X.

Communication dated Apr. 14, 2015 from the Japanese Patent Office in counterpart Application No. 2011-095199.

Communication dated Jun. 30, 2015 from the Japanese Patent Office in counterpart application No. 2011-095199.

Communication dated Nov. 30, 2015, issued by the European Patent Office in corresponding European Application No. 12774528.9.

* cited by examiner

|  |  | EXAMPLE 1 | EXAMPLE 2 | CONVENTIONAL EXAMPLE |
|---|---|---|---|---|
| POSITION OF TREAD APPLICATION SURFACE | FIRST RETREADING | B 1 | B 3 | B 3 |
|  | SECOND RETREADING | B 2 | B 2 | B 3 |
|  | THIRD RETREADING | B 3 | B 1 | B 3 |
| HIGH-SPEED DURABILITY |  | 125 | 110 | 100 |

RETREADED TIRE MANUFACTURING METHOD AND TIRES SUITED THEREFOR

CROSS REFERENCE TO RELATED APPLICATIONS

This application is a National Stage of International Application No. PCT/JP2012/060268 filed Apr. 16, 2012, claiming priority based on Japanese Patent Application No. 2011-095199, filed Apr. 21, 2011, the contents of all of which are incorporated herein by reference in their entirety.

TECHNICAL FIELD

The present invention relates to a manufacturing method of retreaded tires and, more particularly, to a retreaded tire manufacturing method capable of improving the durability of the tires and tires suited for this manufacturing method.

BACKGROUND ART

There is a conventionally known manufacturing method of a retreaded, or recapped, tire in which the tire assembly is formed of a base tire, which is the base for the tire, and a tread rubber, which is disposed around the periphery of the base tire to come in contact with the road surface. In this method, a buffing operation is first carried out to abrade the outer periphery of a tire away. Then a tread rubber is wound around the buffed surface of the tire after the buffing operation, and the tire is placed in a curing unit. Thus a retreaded tire is obtained as a finished product of a base tire and new tread rubber integrated with each other.

For example, Patent Document 1 proposes a retreaded tire for aircraft featuring a cushion rubber, consisting of a lower rubber layer and an upper rubber layer, placed between a belt and a crown protective layer. And the arrangement is such that the stress occurring when 300% or more of elongation is given to the upper rubber layer is lower than the stress occurring when 300% or more of elongation is given to the lower rubber layer. Besides, the breaking elongation of the upper rubber layer is greater than the breaking elongation of the lower rubber layer. As a result, the interface between the upper rubber layer and the lower rubber layer is made a boundary for easier removal at buffing, thereby preventing the peeling of cushion rubber together with the tread rubber and the crown protective layer.

In the method disclosed in Patent Document 1, however, the buffed surface formed by abrading the tread rubber away is always the surface of the lower rubber irrespective of the repeat count of buffing (repeat count of retreading). Accordingly, the greater the repeat count of retreading, that is, the greater the number of entries in the curing unit, the further the deterioration due to curing of the lower rubber surface, or the buffed surface, will progress. This will lead to a drop in delamination resistance of the cushion rubber and the tread rubber placed on the buffed surface. Eventually this will cause a gradual drop in the durability required of the tire.

RELATED ART DOCUMENT

Patent Document

Patent Document 1: Japanese Unexamined Patent Application Publication No. 2010-247660

SUMMARY OF THE INVENTION

Problem to be Solved by the Invention

The present invention has been made to solve the above-described problems, and an object thereof is to provide a retreaded tire manufacturing method, which avoids forming the buffed surface always in the same position by an abrasion process for tire retreading and the resulting drop in delamination resistance of new tread rubber, and tires suited for this manufacturing method.

Means for Solving the Problem

To solve the above-described problems, in one aspect of the present invention, a retreaded tire manufacturing method includes the process of forming a tread application surface, to which new tread rubber is applied, by abrading away tread rubber of the tire circumferentially. And the position where the tread application surface is formed is radially changed as the repeat count of tire retreading rises.

According to this invention, the position of the tread application surface, to which new tread rubber is applied, is changed radially as the repeat count of tire retreading rises. Hence, it is possible to prevent the tread application surface from being formed in the same position by multiple retreading operations.

Thus, a retreaded tire retaining the durability equivalent to that of a new tire can be obtained without a drop in delamination resistance of tread rubber despite multiple retreading operations.

Also, in another aspect of the present invention, the retreaded tire manufacturing method is such that the position where the tread application surface is formed is changed radially inward from a radially outer position as the repeat count of tire retreading rises.

According to this invention, the position where the tread application surface is formed is changed radially inward from a radially outer position. Therefore, in addition to the advantage of the previous aspect, one time of retreading operation can remove simultaneously the previously formed tread application surface. Thus, without the old tread application surface remaining, a retreaded tire retaining the durability equivalent to that of a new tire can be obtained.

Also, in a further aspect of the present invention, the retreaded tire manufacturing method is such that the position where the tread application surface is formed is radially outside of a restraining member located at a radially outermost position in the tire at least once in multiple retreadings.

According to this invention, the position where the tread application surface is formed is radially outside of a restraining member located at a radially outermost position in the tire. Therefore, in addition to the advantage of each of the previous aspects, the restraining member can be used more than once because the simultaneous removal of the restraining member in a retreading operation can be prevented.

Also, in yet another aspect of the invention, a tire suited for a retreaded tire manufacturing method of the foregoing aspects has a belt layer, in which a belt located in a radially outermost position thereof is located radially inside of a virtual line passing through the deepest portions of the groove bottoms formed in the tread when the tire is inflated under an internal pressure.

According to this invention, the belt located in a radially outermost position is located radially inside of a virtual line passing through the deepest portions of the groove bottoms formed in the tread when the tire is inflated under an internal pressure. As a result, it is certainly possible to prevent the surface of the belt from being exposed or damaged in the removal of the grooves formed in the tread region.

Also, in still another aspect of the invention, the tire has a belt reinforcement member located radially outside of the belt layer. And the belt reinforcement member is located radially inside of a virtual line passing through the deepest portions of the groove bottoms formed in the tread when the tire is inflated under an internal pressure.

According to this invention, the belt reinforcement member located in a radially outermost position is located radially inside of a virtual line passing through the deepest portions of the groove bottoms formed in the tread when the tire is inflated under an internal pressure. Therefore, it is certainly possible to prevent the surface of the belt reinforcement member from being exposed or damaged in the removal of the grooves formed in the tread region.

Hereinafter, the invention will be described based on preferred embodiments which do not intend to limit the scope of the claims of the present invention but exemplify the invention. All of the features and the combinations thereof described in the embodiments are not necessarily essential to the invention, and they include constructions and arrangements to be employed selectively.

BEST MODE FOR CARRYING OUT THE INVENTION

Figure 1:
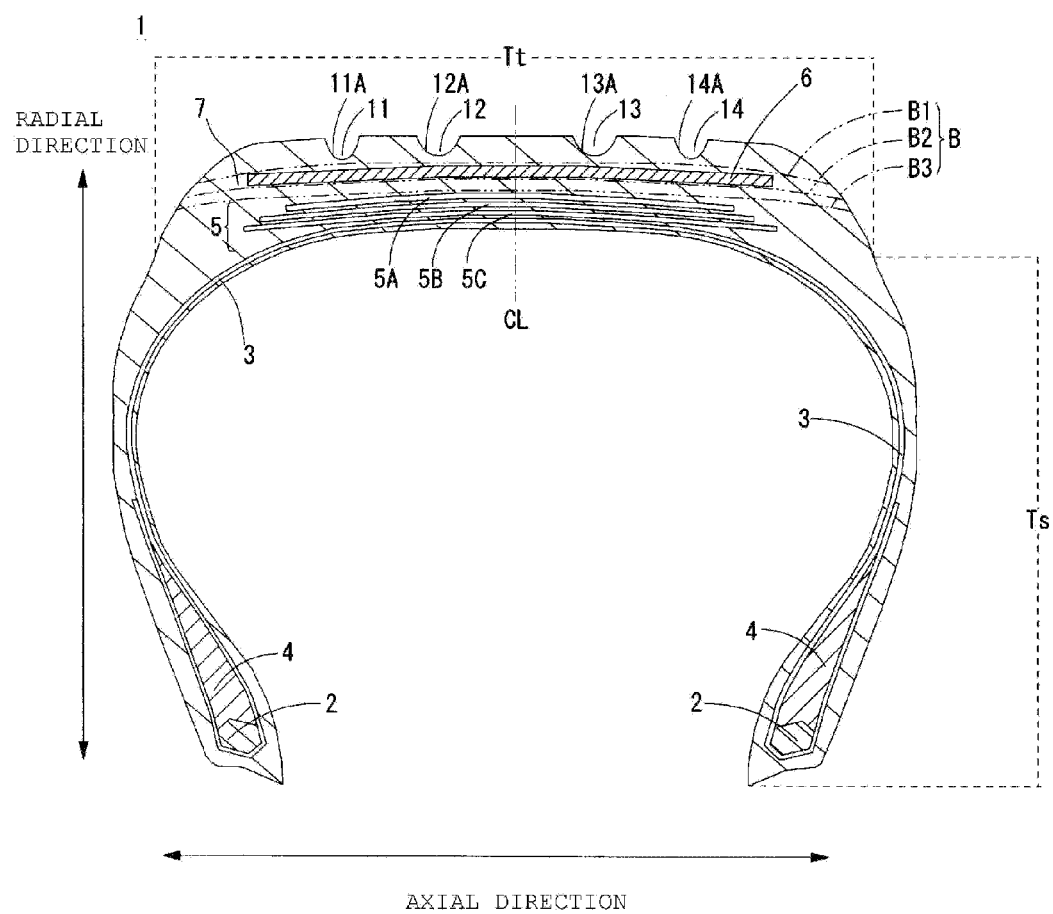
FIG. 1 is an axial cross-sectional view of a tire.

FIG. 1 is an axial cross-sectional view of a tire 1. A description of a basic structure of the tire 1 is given by referring to the figure.

In FIG. 1, the tire 1 is a tire before retreading (recapping), which is roughly comprised of a pair of bead cores 2, a carcass 3, bead filler 4, a belt layer 5, a belt reinforcement member 6 and a tread rubber layer 7 (hereinafter sometimes referred to simply as tread rubber 7).

The bead cores 2, which are each a bundle of steel cords shaped in a ring, are a pair of members spaced apart from each other in the axial direction of the tire 1. Provided between the pair of bead cores 2 is a carcass 3 which extends toroidally astride the bead cores 2, thus forming the framework of the tire 1.

The bead filler 4 is a hard rubber located radially outside of the bead core 2. The bead filler 4 is inserted, or held, in the end of the carcass 3 which is folded back around the bead core 2. Note, however, that the bead filler 4 is not an absolute necessity. The presence or absence of the bead filler 4 should be selected according to the required performance of the tire 1.

The belt layer 5 is a part located radially outside of the carcass 3 in the tread region Tt of the tire 1. The belt layer 5 is formed of a plurality of belts 5A to 5C laminated on top of each other. Also, the plurality of belts 5A to 5C are integrated to each other with bonding layers or rubber layers that are placed in between them. Therefore, the belt layer 5 is a restraining member that provides a hoop effect by preventing the tread region Tt from radially arching out when the tire rotates.

The tread rubber layer 7 is a region of the tire located radially outside of the belt layer 5. A predetermined tread pattern having a plurality of tread grooves 11 to 14 extending continuously along the circumference of the tire is formed on the surface of the tread rubber layer 7 that comes in contact with the road surface when the tire rotates. It should be noted that the tread pattern is not limited to the one shown herein, but may include the rib groove type, the lug groove type, the block type, which is a combination of the rib groove and lug groove types, and the type having sipes which are added edge elements (all not shown).

Disposed inside the tread rubber layer 7 of the present embodiment is a belt reinforcement member 6 designed to reinforce the belt layer 5. The belt reinforcement member 6 is a member comprising a wavy set of steel cords or Kevlar fiber cords, for instance, which is spread in the axial direction of the tire 1 in the same way as the belt layer 5.

Located within the tread rubber layer 7, the belt reinforcement member 6 is disposed radially outside, and spaced apart from, the belt 5A which is located in the radially outermost position of the belt layer 5. The belt reinforcement member 6 is not only a restraining member that provides a hoop effect like the belt layer 5 but also a member that prevents damage from being externally inflicted to the belt layer 5.

Also, it is to be noted that the belt reinforcement member 6 in the present embodiment is a restraining member located in a radially outermost position in the tire 1.

Hereinbelow, a description is given of a retreaded tire manufacturing method according to the present embodiment with reference to FIG. 1. For convenience of explanation, the region of the tire 1 in FIG. 1 which includes the belt layer 5 and the tread rubber layer 7 is referred to as the tread region Tt, and the region which includes the bead core 2 and the bead filler 4 and is located radially inside of the tread region Tt is referred to as the side region Ts. Also, the axial center position of the tire 1 is referred to as the axial center CL.

Note that the extents of the respective regions may vary with the use, type, size, and the like of the tire. For example, it is possible to regard them as further subdivided regions, such as the bead region, the sidewall region, and the shoulder region.

With reference to FIG. 1, a description is given of a specific method involving three times of retreading of the tire 1 using a buffing machine. It should be noted that the repeat count of retreading is not limited to three times, although it is described so in the present example.

As indicated by the virtual lines (buff lines) B1 B2, and B3 in FIG. 1, the tread rubber layer 7 in the tread region Tt of the tire 1 is abraded (buffed) by the not-shown buffing machine, first at a radially outer position and then incrementally at radially inner positions as the repeat count of retreading rises. That is, the tread application surface B is formed progressively at the positions indicated by the virtual lines B1 B2, and B3 by respective buffing operations. Thus, the position of the tread application surface B changes from a radially outer position to radially inner positions.

Abrasion (buffing) of the tread rubber layer 7 is performed with the rotatably mounted tire 1 rotated at a predetermined speed and the surface of the tread rubber layer 7 pressed against the abrading mechanism of the buffing machine.

The buffing machine operates to form a predetermined tread application surface B in a position indicated by the corresponding one of the virtual lines according to the repeat count of retreading. And in the tread region Tt on completion of buffing, a tread application surface B with the tread grooves 11 to 14 removed is formed uniformly along the circumference of the tire. The tire having the tread application surface B with the tread grooves 11 to 14 removed is a tire called a base tire, which serves as the base for a retreaded tire to be built newly. Also, the tread application surface B has a surface rough enough to allow easy fixation of uncured tread rubber to be discussed later.

Figures 2, 3:
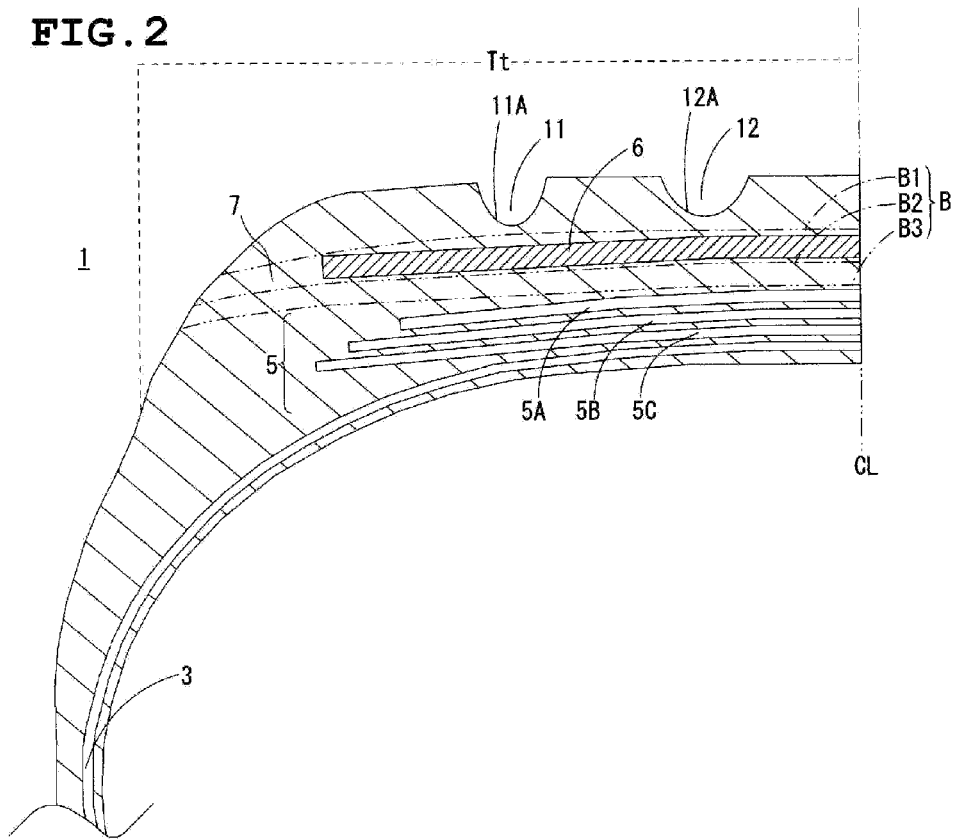
FIG. 2 is an enlarged sectional view of a tire showing the positions of tread application surfaces formed.
FIG. 3 is the table showing the results of a durability test.

FIG. 2 is an enlarged sectional view of a tire showing the positions of the tread application surfaces B formed by three times of retreading. Hereinafter, a description is given of the position of the tread application surface B formed according to the repeat count of retreading.

As shown in FIG. 2, the tread application surface B1 to be formed by the first time of retreading is formed within a range radially inside of the groove bottoms 11A to 14A of the tread grooves 11 to 14 formed in the surface of the tread rubber 7 and radially outside of the belt reinforcement member 6 disposed in the tread rubber layer 7.

The tread application surface B1 to be formed by the first time of retreading is located radially inside of the groove bottoms 11A to 14A of the tread grooves 11 to 14. This arrangement ensures a complete removal of the tread grooves 11 to 14 which have reduced depths due to tire wear resulting from contact with the road surface.

Also, the tread application surface B1 is located radially outside of the belt reinforcement member 6 disposed in the tread rubber layer 7. This arrangement provides an economic advantage because it allows the reuse of the belt reinforcement member 6 instead of its reinstallation. It is to be noted that the tread rubber layer 7 may be abraded away until the radially outer surface of the belt reinforcement member 6 is exposed. In this case, however, the buffing should preferably be stopped when there is still a thin film of tread rubber layer 7 remaining on the belt reinforcement member 6. This is to avoid any instances of the buffing causing damage to the belt reinforcement member 6.

On completion of the first time of buffing with the buffing machine, the base tire formed with a tread application surface B is conveyed to the tread rubber application and curing processes to be described later. There, a new uncured tread rubber 7 of a thickness corresponding to the thickness of preceding buffing is wound around the base tire. Then the base tire with the new tread rubber 7 on is cured to complete the production of a retreaded tire that exhibits a performance equivalent to that of the tire 1 before retreading.

Next, a description is given of the tread application surface B2 to be formed by the second time of retreading. When the wear of the retreaded tire having the tread application surface B1 set in the above-described range progresses, the tire needs to be retreaded again by abrading the tread rubber 7 away. In this case, the tread application surface B is changed to the tread application surface B2 positioned radially inside of the tread application surface B1 formed by the first time of retreading.

More specifically, the tread application surface B2 is formed within a range of the tread rubber layer 7 radially inside of the belt reinforcement member 6, which is a restraining member located in a radially outermost position, and radially outside of the belt layer 5.

As described above, the tread application surface B2 to be formed by the second time of retreading is changed to a position radially inside of the tread application surface B1 formed by the first time of retreading, that is, a position different from the previous one. As a result, no drop in delamination resistance due to deterioration from curing occurs, unlike the case where the tread application surface B is always formed in the same position.

Moreover, with the position of the tread application surface B2 changed from that of the tread application surface B1 formed by the first time of retreading, the tread application surface B1 formed by the first time of retreading will also be abraded away by the second time of buffing. As a result, there will be no presence of a plurality of tread application surfaces (B1, B2). And this will prevent any drop in the durability of the retreaded tire as a whole.

In other words, while it is possible to form the tread application surface B2 radially outside of the tread application surface B1, it is preferable that the tread application surface B2 is formed in a position radially inside of the tread application surface B1, from the viewpoint of preventing any drop in delamination resistance through the avoidance of the presence of a plurality of tread application surfaces B.

It is to be noted that, in this embodiment, the belt reinforcement member 6 is also abraded away by the second time of buffing the tread rubber layer 7, but the belt reinforcement member 6 is reinstalled in the subsequent tread rubber application and curing processes to be described later.

Next, a description is given of the tread application surface B3 to be formed by the third time of retreading. When the wear of the retreaded tire having the tread application surface B2 set in the above-described range progresses, the tire needs to be retreaded again by abrading the tread rubber 7 away. In this case, the tread application surface B is changed to the tread application surface B3 positioned radially inside of the tread application surface B2 formed by the second time of retreading.

More specifically, the tread application surface B3 is formed within a range of the tread rubber layer 7 radially inside of the tread application surface B2 and radially outside of the belt layer 5.

In the same way as the second time of retreading, the tread application surface B3 to be formed by the third time of retreading is changed to a position radially inside of the tread application surface B2 formed by the second time of retreading, that is, a position different from the previous one. As a result, no drop in delamination resistance due to deterioration from occurs, unlike the case where the tread application surface B is always formed in the same position.

As heretofore described, in the retreaded tire manufacturing method of the present embodiment, the position of the tread application surface B to which new tread rubber 7 is applied is changed radially, and more preferably radially inward, as the repeat count of retreading rises. This makes it possible to prevent any drop in delamination resistance, thereby obtaining a retreaded tire retaining a durability equivalent to that of a new tire.

It should be noted that in the present embodiment, the extent of abrasion (buffing) in the tread region Tt is within a range in the tread rubber layer 7. But the arrangement is not limited thereto; rather, the extent of abrasion may be extended to the belt layer 5. In such a case, the specific range of buffing may be such that abrasion in the tread region Tt is performed until the surface of the belt 5A, which is located in a radially outermost position of the belt layer 5, is exposed. Or the buffing range may be further extended such that the belt 5A located in a radially outermost position is abraded away, so that a tread rubber layer 7 including a new belt 5A is applied in the retreading.

Also, the number of positions and the repeat count of formation of the tread application surface B, which increase with the repeat count of retreading, may change as appropriate so long as the durability of the base tire after the buffing operation does not develop any problem. That is, the tread application surface B may be formed two times or more in positions radially outside of the belt reinforcement member 6. Or the tread application surface B may be formed four times or more at narrower intervals.

Hereinbelow, a description is given of a process of integrating together a base tire formed with a tread application surface B (B1, B2, B3) as described above and a new tread rubber 7. This process includes a tread rubber application process, in which a new uncured tread rubber 7 is wound around a base tire, and a curing process, in which the wound tread rubber 7 and the base tire are firmly bonded together.

Firstly, a ribbon-like uncured tread rubber 7, which is formed with a width narrower than the width of the tread application surface B, is wound a predetermined number of turns around the tread application surface B (B1, B2, B3) having been formed by abrading the tread region Tt, to a predetermined thickness along the circumference of the base tire.

It is to be noted that in the present embodiment, the amount (thickness) of tread rubber 7 abraded away increases from the first time to the third time of buffing. Therefore, to complement the abraded amount of the tread rubber 7, the thickness of the new tread rubber 7 is set thicker as the repeat count of retreading rises.

Also, in the second time and thereafter or retreading, the belt reinforcement member 6 is removed. Hence, a new belt reinforcement member 6 must be placed within the new tread rubber 7 which is wound in the second time of retreading and thereafter.

The base tire and tread rubber 7 provisionally integrated together in the tread rubber application process is now conveyed to the curing process. In the curing process, the provisionally integrated base tire and uncured tread rubber 7 are placed in a mold, where they are cured under heat and pressure.

With a lapse of predetermined time, a cross-linking reaction of the uncured tread rubber 7 progresses and as a result, the tread rubber 7 gets solidified and firmly fixed to the tread application surface B. Thus completes the manufacture of a retreaded tire that exhibits the performance of a product tire which consists of firmly integrated base tire and tread rubber 7. Also, formed on the ground contact side of the tread rubber 7 is a tread pattern matching the inside shape of the mold.

In the present embodiment, uncured tread rubber 7 is wound around the tread application surface B of a base tire before they are cured in a mold. But the arrangement is not limited thereto.

For example, an uncured cushion rubber is applied on the tread application surface B of a base tire, and then a new tread rubber 7, which has been cured and molded in advance, is placed on the base tire through the medium of the cushion rubber. Following this, by curing the uncured cushion rubber, it is possible to manufacture a retreaded tire that exhibits the performance of a product tire consisting of a base tire integrated with tread rubber 7.

Hereinbelow, with reference to the table of FIG. 3, a description is given of the results of a durability test of retreaded tires manufactured by the manufacturing method as described in the foregoing embodiment.

Test Conditions:
Tire size: 50×20, OR22/32PR radial tire for aircraft.
Test method: Retreading with the position of the tread application surface B changed is repeated three times. A takeoff test at a predetermined tire internal pressure and a predetermined load is repeated on an indoor drum tester, and the repeat count of the test before the retreaded tire develops trouble is determined (The larger the count in comparison with 100 of the conventional tire, the better the performance is.).

In the table of FIG. 3, the retreaded tire of Example 1 had the tread application surface B1 formed radially outside of the belt reinforcement member 6 in the first time of retreading, the tread application surface B2 formed radially inside of the belt reinforcement member 6 in the second time of retreading, and the tread application surface B3 formed radially inside of the tread application surface B2 in the third time of retreading. In other words, the tire of Example 1 was a tire having the position of the tread application surface B, around which new tread rubber layer 7 was wound, changed radially inward as the repeat count of retreading rose.

Contrary to the retreaded tire of Example 1, the retreaded tire in Example 2 had the tread application surface B3 formed in the first time of retreading, the tread application surface B2 formed radially outside of the tread application surface B3 in the second time of retreading, and the tread application surface B1 formed radially outside of the belt reinforcement member 6 in the third time of retreading. In other words, the tire of Example 2 was a tire having the position of the tread application surface B, around which new tread rubber layer 7 was wound, changed radially outward as the repeat count of retreading rose.

The retreaded tire of the Conventional Example was a tire having the tread application surface B3 formed in the same position irrespective of the repeat count of retreading.

As is clear from the results (durability) shown in the table, the retreaded tires of Examples 1 and 2 manufactured as described in the foregoing embodiments showed markedly improved durability upon that of the retreaded tire of the Conventional Example. This fact derives from a manifest prevention of any drop in tire delamination resistance which was realized by changing the position of the tread application surface B in relation to the repeat count of retreading.

Also, in the comparison between the retreaded tire of Example 1 and the retreaded tire of Example 2, the results indicated the superiority of the retreaded tire of Example 1. This fact derives from a manifest prevention of any drop in tire delamination resistance that can otherwise occur with the continuing presence of the tread application surfaces B formed in the past.

From these results, it has been confirmed that the durability of a retreaded tire can be improved by changing the position of the tread application surface B in relation to the repeat count of retreading. Further, it has also been confirmed that the durability of a retreaded tire can be markedly improved by changing the forming position of the tread application surface B radially inward from a radially outer position.

Hereinbelow, a description is given of the structure of a tire 10 which can be suitably retreaded by a manufacturing method described in the foregoing embodiments.

Figure 4:
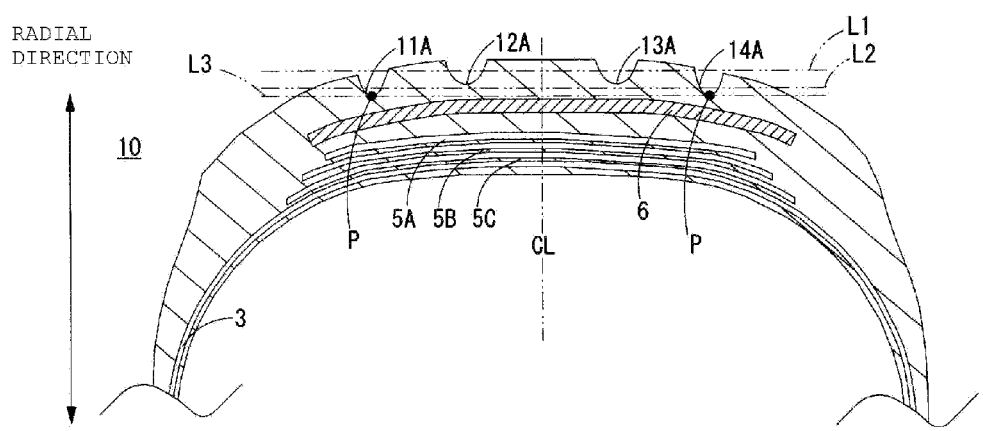
FIG. 4 is an enlarged sectional view of a tire inflated with air.

FIG. 4 is an enlarged sectional view of a tire 10, which is a tire 1 inflated with air at a specified internal pressure. As shown in the figure, the tire 10, when compared with the tire 1 not inflated under an internal pressure as shown in FIG. 1, is expanded radially outward, resulting in an arcuate displacement of the tread region Tt with CL at its center. And when the tread region Tt is displaced, the belt reinforcement member 6 and the plurality of belts 5A to 5C, constituting the belt layer 5, which are both disposed inside the tread region Tt, will be displaced in a similar manner.

Also, as indicated by virtual lines L1 and L2 in the figure, the wear in the rotating tire 10 progresses radially inward in a straight line.

As explained in the foregoing embodiments, reuse of the tire without reinstallation of the belt reinforcement member 6 can be accomplished by locating the tread application surface B1 radially outside of the belt reinforcement member 6 disposed inside the tread rubber layer 7. In this regard, it is preferable that the belt reinforcement member 6 is so set in advance as to be radially inside of the groove bottoms 11A to 14A of the plurality of tread grooves 11 to 14 in the tire 10 when inflated with air.

More specifically, it is preferable that the belt reinforcement member 6 is located radially inside of the virtual line L3 passing through the deepest points P of the groove bottoms 11A and 14A which are the closest to the rotation center Q of the tire 10 of the plurality of tread grooves 11 to 14.

If the tire 1 is structured under these conditions, then the belt reinforcement member 6 will not be exposed by the removal of the tread grooves 11 to 14 by the first time of retreading. Thus, it will be possible to apply a new tread rubber 7 without causing damage to the belt reinforcement member 6 or engaging in the replacement of the belt reinforcement member 6.

It should be noted that in the example described in the present embodiment, the tire 10 is provided with axially four tread grooves. Yet, the arrangement is not limited thereto, and the tire may be provided with two tread grooves symmetrical to each other with respect to CL as the center or with only one tread groove.

Also, the shape of the groove bottom is not limited to the above example. Rather, the cross section of the groove may be rectangular, V-shaped, or any other shape that can be rightly assumed.

Figure 5:
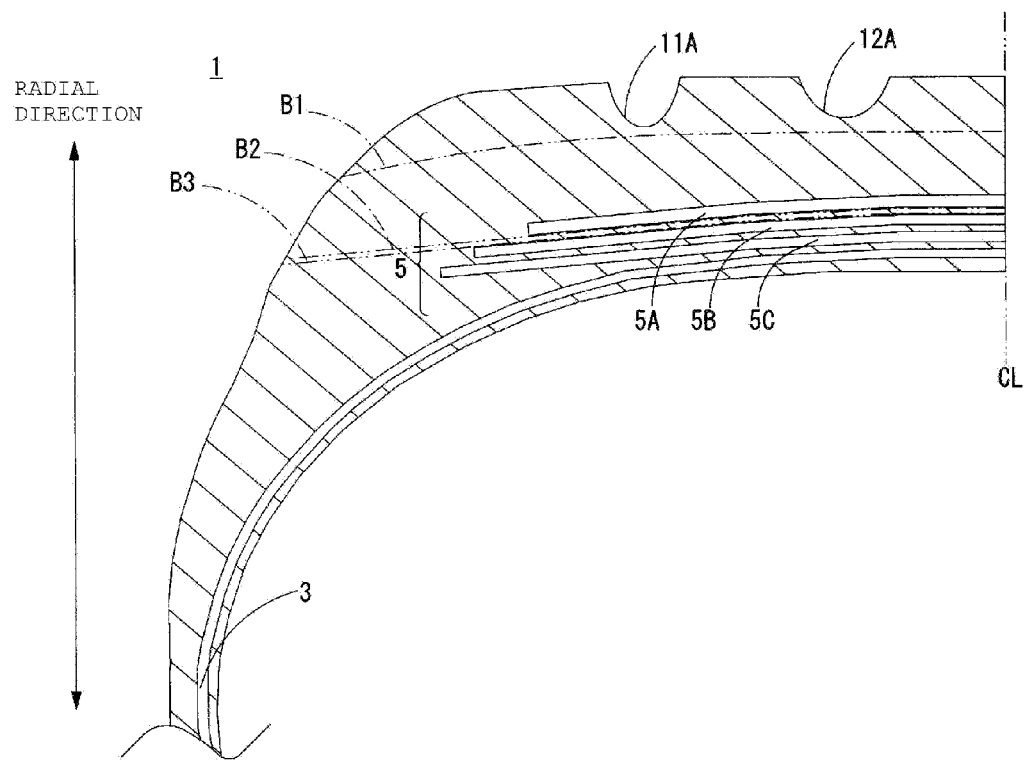
FIG. 5 is an enlarged sectional view of a tire according to another embodiment.

Hereinbelow, a description is given of another embodiment of the present invention. As shown in FIG. 5, there is no belt reinforcement member 6 disposed in the tread region Tt of the tire 1 in this embodiment. It differs from the previous embodiment in that the restraining member located in a radially outermost position is the belt 5A which is a constituent member of the belt layer 5. The tire 1 like this can also be suitably retreaded by a manufacturing method as described in the previous embodiment.

In this embodiment, the tread application surface B1 to be formed by the first time of retreading is formed radially inside of the groove bottoms 11A to 14A of the tread grooves 11 to 14 formed in the tread rubber 7 and radially outside of the belt 5A disposed in a radially outermost position inside the tread region Tt.

Next, the tread application surface B2 to be formed by the second time of retreading is formed radially inside of the belt 5A disposed in a radially outermost position and radially outside of the belt 5B. Accordingly, the radially outermost belt 5A is removed by the formation of the tread application surface B2, and a new belt 5A is to be installed.

Next, the tread application surface B3 to be formed by the third time of retreading is formed radially inside of the tread application surface B2 and radially outside of the belt 5B. Accordingly, the radially outermost belt 5A installed in the second retreading is removed by the formation of the tread application surface B3, but the belt 5B radially inside of the belt 5A remains without being abraded away.

Note that in this embodiment, too, the arrangement may be such that the position of the tread application surface B is changed radially outward from a radially inner position as the repeat count of retreading the tire 1 rises.

As described above, in this embodiment, too, the forming position of the tread application surface B is changed radially inward from a radially outer position as the repeat count of retreading the tire 1 rises. This makes it possible to remove the previously formed tread application surface B whenever the tire is retreaded. Thus the durability of the tire 1 can be improved without the previously formed tread application surfaces B remaining in the retreaded tire 1.

Moreover, an economic advantage is provided because the tread application surface B is formed at least once radially outside of the belt 5A located in a radially outermost position.

It is to be noted that, although the explanation is omitted here, in structuring a tire 10 suited for the manufacturing method of this embodiment, the position of the belt 5A located in a radially outermost position should be so set in advance as to be radially inside of the above-mentioned virtual line L3. Then it will no longer be necessary to replace the belt 5A at least in the first time of retreading.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

DESCRIPTION OF REFERENCE NUMERALS

1 tire
2 bead core
3 carcass
4 bead filler
5 belt layer
5A-5C belt
6 belt reinforcement member
7 tread rubber (tread rubber layer)
10 tire
11-14 tread groove
11A-14A groove bottom
B (B1, B2, B3) tread application surface
P deepest point
Q rotation center

The invention claimed is:

1. A retreaded tire manufacturing method, the tire comprising a belt layer formed of a plurality of belts and a belt reinforcement member disposed radially outside and spaced apart from the belt layer; comprising steps of:
    forming a tread application surface, to which new tread rubber is applied, by abrading away tread rubber of the tire circumferentially,
    wherein, at a first time of retreading, a position where the tread application surface is formed is located radially outside of the belt reinforcement member,
    wherein, at a second time of retreading, a position where the tread application surface is formed is formed within a range of the tread rubber layer radially inside of the belt reinforcement member and radially outside of the belt layer,
    wherein, at a third time of retreading, by abrading away the tread rubber until the belt located in a radially outermost position of the belt layer is exposed, a position where the tread application surface is formed is formed on a surface of the exposed belt;
    applying a tread rubber including a belt reinforcement member corresponding with the buffed tread rubber on the application surface formed at the second and the third time of retreading.

2. A tire suited for the retreaded tire manufacturing method of claim 1,
   wherein a belt located in a radially outermost position of the belt layer is located radially inside of a virtual line passing through the deepest portions of groove bottoms formed in the tread when the tire is inflated under an internal pressure.

3. The retreaded tire manufacturing method according to claim 1, wherein an uncured cushion rubber is applied on the tread application surface of a base tire.

4. A tire suited for the retreaded tire manufacturing method of claim 3,
   wherein a belt located in a radially outermost position of the belt layer is located radially inside of a virtual line passing through the deepest portions of groove bottoms formed in the tread when the tire is inflated under an internal pressure.

5. The tire according to claim 2,
   wherein the belt reinforcement member is located radially inside of a virtual line passing through the deepest portions of groove bottoms formed in the tread when the tire is inflated under an internal pressure.

6. The retreaded tire manufacturing method according to claim 1, wherein an uncured tread rubber is wound around the tread application surface of a base tire.

7. A tire suited for the retreaded tire manufacturing method of claim 6,
   wherein a belt located in a radially outermost position of the belt layer is located radially inside of a virtual line passing through the deepest portions of groove bottoms formed in the tread when the tire is inflated under an internal pressure.

* * * * *